United States Patent [19]

Cooley et al.

[11] Patent Number: 4,581,235
[45] Date of Patent: Apr. 8, 1986

[54] POWDER FOR MAKING ALCOHOLIC BEVERAGE BY FERMENTATION

[75] Inventors: Herbert J. Cooley, Geneva, N.Y.; David G. Cunningham, Middleboro, Mass.

[73] Assignee: George W. Hoskins, Toronto, Canada

[21] Appl. No.: 521,387

[22] Filed: Aug. 5, 1983

[51] Int. Cl.$^4$ .............................................. C12C 11/00
[52] U.S. Cl. ........................................ 426/11; 426/15; 426/62
[58] Field of Search ....................... 426/11, 15, 62, 592

[56] References Cited

U.S. PATENT DOCUMENTS

| | | | |
|---|---|---|---|
| 3,795,747 | 3/1974 | Mitchell | 426/592 |
| 3,843,809 | 10/1974 | Luck | 426/11 X |
| 4,178,389 | 3/1978 | Pilla | 426/11 |
| 4,186,252 | 1/1980 | Silhankova | 426/11 X |
| 4,350,765 | 9/1982 | Chibata | 426/11 X |
| 4,454,165 | 6/1984 | Sato | 426/592 |

OTHER PUBLICATIONS

Long, Z. R., *Wine Production Technology in the United States* (M. A. Amerine, ed.), Amer. Chem. Soc., Washington, D.C., 1981, p. 42.

*Primary Examiner*—Sidney Marantz
*Assistant Examiner*—Jeremy M. Jay
*Attorney, Agent, or Firm*—Joseph P. Gastel

[57] ABSTRACT

A powder for making an alcoholic beverage by fermentation consisting by weight of yeast in an amount of between about 0.15% to 50%, an edible acid in an amount of between about 10% and 80%, a buffer in an amount of between about 4% and 80%, a nitrogen-producing compound in an amount of between about 0.1% and 25%, and a combined nutrient-flavor agent in an amount of between about 1% and 80%. The powder is mixed with sugar and water, and the mixture is allowed to ferment. If the nutrient-flavor agent is grape, the resulting alcoholic beverage will have a wine-like flavor.

15 Claims, No Drawings

POWDER FOR MAKING ALCOHOLIC BEVERAGE BY FERMENTATION

BACKGROUND OF THE INVENTION

The present invention relates to a powder which can be mixed with sugar and water, and which is thereafter permitted to ferment to produce an alcoholic beverage.

U.S. Pat. No. 4,178,389 an alcoholic beverage making composition and process is disclosed wherein a powder is mixed with sugar and water to produce a wine-like beverage. However, the powder disclosed in this patent contains numerous ingredients which have been found to be unnecessary.

SUMMARY OF THE INVENTION

It is accordingly one object of the present invention to provide a fermentable alcoholic beverage powder which contains relatively few ingredients and which, when mixed with sugar and water, and permitted to ferment, will produce an alcoholic beverage which tastes like wine, if a grape nutrient-flavor is used, or which tastes like other fruits, if other fruit nutrient-flavors are used. Other objects and attendant advantages of the present invention will readily be perceived hereafter.

The present invention relates to a powder for making an alcoholic beverage by fermentation comprising by weight yeast in an amount of between about 0.15% to 50%, an edible acid in an amount of between about 10% and 80%, a buffer in an amount of between about 4% and 80%, a nitrogen producing compound in an amount of between about 0.1% and 25%, and a nutrient-flavor agent in an amount of between about 1% and 80%.

The present invention also relates to a mixture for producing an alcoholic beverage by fermentation comprising by weight yeast in an amount of between about 0.15% to 50%, an edible acid in an amount of between about 10% and 80%, a buffer in an amount of between about 4% and 80%, and a nitrogen producing compound in an amount of between about 0.1% and 25%, a nutrient-flavor agent in an amount of between about 1% and 80%, and sugar and water in an effective amount to coact with said prior ingredient to produce fermentation.

The various aspects of the present invention will be more fully understood when the following portions of the specification are read:

DESCRIPTION OF THE PREFERRED EMBODIMENTS

The improved powder for making an alcoholic beverage by fermentation is essentially a mixture of various compounds, which when combined with sugar and water, will produce an alcoholic beverage after a period of fermentation.

The powder includes a suitable yeast to consume the sucrose (sugar) which is added to the powder and water, and to leave in the place of sucrose carbon dioxide and alcohol. The carbon dioxide leaves the solution as a gas. The preferred yeast which is to be used is Montrachet #522. However, other yeasts, such as Pasteur Champagne or Flor Sherry #519 may be used. In fact, any other suitable yeast strain Saccharomyces cerevisiae may be used to ferment the sugar to alcohol. The yeast may be present by weight in an amount of between about 0.15% and 50%, and more preferably between about 3.0% and 25%, and more preferably about 11.4% and 13.8%.

The acid which forms a part of the composition is used to produce in the alcoholic beverage the proper tart taste which is normally associated with natural wine products. It also functions to create an acid environment in which the yeast can perform its function. It also serves to prevent the growth of organisms potentially harmful to humans. The preferred acid which may be used is malic or tartaric acid. However, other acids which may be used are acetic, adipic, citric, fumaric, lactic, phosphoric, succinic and tannic. The acids may be present in an amount by weight of between about 10% and 80%, and more preferably between 27% and 68%, and most preferably between about 33% and 52%.

The powder also includes a buffer to cause the fermenting liquid to have a pH of between about 3.0 and 3.8. It is desired that the pH be maintained within this range because if it fluctuates beyond this range, the fermentation will be disrupted. Sodium citrate is the preferred buffer. However, other buffers, such as calcium malate, calcium tartrate, potassium malate, potassium tartrate, potassium citrate, sodium malate and sodium tartrate may be used, as well as other suitable salt-acid compounds. The buffer may be present in an amount of between 4% and 80% by weight, and more preferably between 17% and 65%, and more preferably between 25% and 55% by weight.

A nitrogen providing compound is also provided in the powder to provide an initial nitrogen source for the yeast to begin growth and start the fermentation. A preferred compound is ammonium bicarbonate. Other nitrogen producing compounds may be ammonium phosphate, urea or any other suitable compound containing nitrogen. The nitrogen producing compound may be present by weight in an amount of between about 0.1% and 25%, and more preferably between about 1% and 10%, and most preferably between about 3% and 7.2%.

The improved powder for making an alcoholic beverage preferably also contains an anti-caking substance. This compound is not necessary for fermentation, but maintains the remainder of the ingredients in a fluid powder state so that they will mix readily with the water and sugar which is added to them. The preferred anti-caking compound is tricalcium phosphate. However, hydrolyzed cereal solids, lactose, microcystalline cellulose, modified food starches, silica, silicates, silica gels, sorbitol, stearates and whey may also be used. It will be appreciated that since the anti-caking compound is optional, but preferable, it need not be present in the powder. However, if it is used, it may be used in an amount by weight of between about 0.01% and 20%, and more preferably between about 0.02% and 11%, and most preferably between about 0.3% and 1.1%.

Another ingredient which is a part of the improved powder is a nutrient-flavor agent which is used to provide a nutrient for fermentation and a flavor to the product. If the resulting fermented alcoholic beverage is to simulate a wine taste, Beatreme wine powder may be used. This may include Beatreme 2608F, a sauterne wine powder, or Beatreme 2608G, a burgundy wine powder, both of which are commercial products of Beatrice Foods Co., Chicago, Ill. If the resulting fermented beverage is to have a cider-like taste, an apple juice powder is used, and this is also commercially available from the Beatrice Foods. Co. The nutrient-flavor agent may be present by weight in an amount of between about 0.1% and 80%, and more preferably between about 4% and 30%, and most preferably between about 8% and 15%.

In order to enhance the flavor of the alcoholic beverage, artificial or natural flavor powders, such as apricot, cherry, orange, or the like, may be added to the remainder of the powder or to provide the desired taste. The flavor enhancer may be a liquid if it is to be added to the fermented beverage.

The powder may also include coloring agents such as Red Dye #40 or Red Dye #3, extracted beet coloring, extracted grape coloring or any other blue/red or yellow color additive. The range of the color additives depends on the color desired, and it comprises a very small percentage of the whole.

As noted above, the alcoholic beverage is made by adding the powder of the present invention to a sugar-water mixture. To produce a wine of about 12% alcohol by weight, a beginning sugar (sucrose) concentration of 21° Brix is necessary. The alcohol concentration can vary from 16% to 10% and the product will still be stable. In order to change the alcohol content at the end of the fermentation, the sugar content at the beginning of the fermentation must be changed. A Brix of between 25° (16% alcohol) and 18° (10% alcohol) will produce an acceptable product. Domino granulated cane sugar or any other commercial granulated, powdered, or liquid sugar (sucrose) can be used to produce a wine flavored product from the above-discussed ingredients. Experimentation has shown that four level cups of granulated cane sugar dissolved in about one U.S. gallon of water will produce a wine-like product of approximately 13% alcohol.

The following examples show the weight of ingredients for a package which is to be dissolved in one gallon of water with four level cups of sugar:

EXAMPLE 1

| Ingredient | Weight in grams | % by weight |
|---|---|---|
| Freeze dried Montrachet yeast | 4.00 | 13.1 |
| Malic acid | 12.21 | 40 |
| Sodium citrate | 8.80 | 28.8 |
| Ammonium bicarbonate | 1.60 | 5.2 |
| Tricalcium phosphate | 0.17 | .55 |
| Beatreme wine powder Sauterne 2608F for white wine Burgundy 2608G for red wine | 3.70 | 12 |
| F.D. and C. Red #3 granular | as desired | |
| Erythrosine | 30.48 | 99.65 |

EXAMPLE 2

| Ingredient | Weight in grams | % by weight |
|---|---|---|
| Freeze dried Montrachet yeast | 4.00 | 13.0 |
| Tartaric acid | 12.43 | 40.5 |
| Sodium citrate | 8.80 | 28.6 |
| Ammonium bicarbonate | 1.60 | 5.2 |
| Tricalcium phosphate | 0.17 | .55 |
| Beatreme wine powder Sauterne 2608F for white wine Burgundy 2608G for red wine | 3.70 | 12.1 |
| F.D. and C. Red #3 granular | as desired | |
| Erythrosine | 30.70 | 99.95 |

In order to mix the powder, the following steps are followed. Four cups of sugar (908 grams) are placed in a U.S. gallon jug or five cups of sugar (1,135 grams) are placed in an Imperial gallon. The jug is then filled approximately two-thirds full with lukewarm water and the jug is shaked until the sugar has completely dissolved. The powdered ingredients are then placed into the jug with the sugar-water solution and again the jug is shaked thoroughly. The U.S. gallon jug is then filled to about four inches from the top with more water and the water is stirred to insure uniform mixing of the ingredients. The amount of water is about 124 ounces. An airlock is then placed over the top of the jug. The airlock can be a ballon which is taped or fastened with a rubberband about the neck of the jug, and a small pinhole is made in the ballon, or a commercial airlock can be purchased at a wine-making supply store. The mixture is then permitted to ferment for between 28 and 40 days at between about 65° F. and 80° F. The end of the fermentation will be indicated by the suspension of certain of the ingredients settling to the bottom of the jug and thus causing the remaining liquid to be thoroughly clear. The clear liquid is then very gently decanted or siphoned off using a thin tube or hose, while permitting the sediment to remain in the jug. The clear liquid is then placed into suitable capped bottles which should be kept well chilled until the alcoholic product is served. It is best not to sample the alcoholic product until the fermentation has been completed, as indicated above, as the sampling may interfere with proper fermentation. The foregoing procedure will produce a very dry wine, and the pH of the wine produced by using the compositions of Examples 1 and 2 was between 3.28 and 3.38. If a sweeter wine is desired, sugar should be added to taste prior to serving the wine. The additional sugar should not be added at the time of mixing the ingredients, as this might upset the fermentation balance. Furthermore, sweetened wine, that is, wine to which sugar has been added after fermentation has been completed, should not be stored for more than eight hours in a sealed container, because the seal might pop or the bottle might break.

It can thus be seen that the improved alcoholic beverage powder of the present invention is manifestly capable of achieving the above enumerated objects, and while preferred embodiments of the present invention have been disclosed, it will be understood that the present invention is not limited thereto, but may be otherwise embodied within the scope of the following claims.

What is claimed is:

1. A powder for making an alcoholic beverage by fermentation consisting essentially of by weight yeast in an amount of between about 0.15% to 50%, an edible acid in an amount of between about 10% and 80%, a buffer in an amount of between about 4% and 80%, ammonium bicarbonate in an amount of between about 0.1% and 25%, and a nutrient-flavor agent in an amount of between about 1% and 80%.

2. A powder for making an alcoholic beverage by fermentation as set forth in claim 1 wherein said yeast is present by weight in an amount of between about 3% and 25%, and wherein said edible acid is present in an amount of between about 27% and 68%, and wherein said buffer is present in an amount of between about 17% and 65%, and wherein said ammonium bicarbonate is present in an amount of between about 1% and 10%, and wherein said nutrient-flavor agent is present in an amount of between about 4% and 30%.

3. A powder for making an alcoholic beverage by fermentation as set forth in claim 1 wherein said yeast is present by weight in an amount of between about 11.4% and 13.3%, and wherein said edible acid is present in an amount of between about 33% and 52%, and wherein said buffer is present in an amount of between about 25% and 55%, and wherein said ammonium nitrogen bicarbonate is present in an amount of between about 3% and 7.2%, and wherein said nutrient-flavor agent is present in an amount of between about 8% and 15%.

4. A powder for making an alcoholic beverage by fermentation as set forth in claim 1 wherein said yeast is selected from the group consisting of Montrachet #522 and Flor Sherry #519.

5. A powder for making an alcoholic beverage by fermentation as set forth in claim 1 wherein said yeast is a Saccaromyces cerevisiae strain.

6. A powder for making an alcoholic beverage by fermentation as set forth in claim 1 wherein said edible acid is selected from the group consisting of malic and tartaric acid.

7. A powder for making an alcoholic beverage by fermentation as set forth in claim 1 wherein said edible acid is selected from the group consisting of malic, tartaric, acetic, adipic, citric, fumaric, lactic, phosphoric, succinic and tannic acids.

8. A powder for making an alcoholic beverage by fermentation as set forth in claim 1 wherein said buffer is selected from the group consisting of sodium citrate, calcium malate, calcium tartarate, potassium malate, potassium tartarate, potassium citrate, sodium malate, and sodium tartarate.

9. A powder for making an alcoholic beverage by fermentation as set forth in claim 1 including an anti-caking compound by weight in the amount of between about 0.01% and 20%.

10. A powder for making an alcoholic beverage by fermentation as set forth in claim 9 wherein said anti-caking compound is present by weight in an amount of between about 0.02% and 11%.

11. A powder for making an alcoholic beverage by fermentation as set forth in claim 10 wherein said anti-caking compound is selected from the group consisting of tricalcium phosphate, hydrolyzed cereal solids, lactose, microcrystalline cellulose, modified food starches, silica, silicates, silica gels, sorbitol, stearates, and whey.

12. A mixture for producing an alcoholic beverage by fermentation consisting essentially of by weight yeast in an amount of between about 0.15% to 50%, an edible acid in an amount of between about 10% and 80%, a buffer in an amount of between about 4% and 80%, ammonium bicarbonate in an amount of between about 0.1% and 25%, a nutrient-flavor agent in an amount of between about 1% and 80% and sugar and water in an effective amount to produce fermentation.

13. A powder for making an alcoholic beverage by fermentation consisting essentially of comprising by weight yeast in an amount of between about 0.15% to 50%, an edible acid in an amount of between about 10% and 80%, a buffer in an amount of between about 4% and 80%, and a nitrogen producing compound in an amount of between about 0.1% and 25%.

14. A powder for making an alcoholic beverage by fermentation as set forth in claim 13 wherein said yeast is present by weight in an amount of between about 3% and 25%, and wherein said edible acid is present in an amount of between about 27% and 68%, and wherein said buffer is present in an amount of between about 17% and 65%, and wherein said ammonium bicarbonate is present in an amount of between about 1% and 10%.

15. A powder for making an alcoholic beverage by fermentation as set forth in claim 13 wherein said yeast is present by weight in an amount of between about 11.4% and 13.3%, and wherein said edible acid is present in an amount of between about 33% and 52%, and wherein said buffer is present in an amount of between about 25% and 55%, and wherein said ammonium nitrogen bicarbonate is present in an amount of between about 3% and 7.2%.

* * * * *

UNITED STATES PATENT AND TRADEMARK OFFICE
CERTIFICATE OF CORRECTION

PATENT NO. : 4,581,235
DATED : April 8, 1986
INVENTOR(S) : Herbert J. Cooley and David G. Cunningham It is certified that error appears in the above-identified patent and that said Letters Patent are hereby corrected as shown below:

Column 1, line 45, change "ingredient" to --ingredients--.

Column 2, line 1, change "more" to --most--;
          line 2, change "13.8%" to --13.3%--.

Column 5, line 5 (claim 3), delete "nitrogen".

Column 6, line 15 (claim 13), delete "comprising";
          lines 37 and 38 (claim 15), delete "nitrogen".

Signed and Sealed this

Fifth Day of August 1986

[SEAL]

Attest:

DONALD J. QUIGG

Attesting Officer

Commissioner of Patents and Trademarks